(12) United States Patent
Boyers

(10) Patent No.: US 7,040,628 B2
(45) Date of Patent: May 9, 2006

(54) LARGE DIAMETER POLYTETRAFLUOROETHYLENE OR LIKE SEALS

(75) Inventor: Douglas B. Boyers, Sleepy Hollow, IL (US)

(73) Assignee: SKF USA Inc., Elgin, IL (US)

( * ) Notice: Subject to any disclaimer, the term of this patent is extended or adjusted under 35 U.S.C. 154(b) by 0 days.

(21) Appl. No.: 10/737,623

(22) Filed: Dec. 16, 2003

(65) Prior Publication Data

US 2005/0127614 A1    Jun. 16, 2005

(51) Int. Cl.
*F16J 15/32* (2006.01)

(52) U.S. Cl. .................. 277/551; 277/576; 277/577

(58) Field of Classification Search ................ 277/549, 277/553, 556, 559, 561, 551, 572, 576, 577
See application file for complete search history.

(56) References Cited

U.S. PATENT DOCUMENTS

| | | | | |
|---|---|---|---|---|
| 505,084 | A * | 9/1893 | Barnes | 277/631 |
| 866,696 | A * | 9/1907 | Taylor | 277/631 |
| 2,273,962 | A * | 2/1942 | Hubbard | 277/555 |
| 2,329,028 | A * | 9/1943 | Austin | 277/555 |
| 3,341,211 | A | 9/1967 | Houghton et al. | |
| 3,408,095 | A | 10/1968 | Moore | |
| 3,838,862 | A * | 10/1974 | Fern | 277/400 |
| 3,924,861 | A * | 12/1975 | Szepesvary | 277/551 |
| 3,995,868 | A | 12/1976 | Smith | |
| 4,042,248 | A * | 8/1977 | Williamitis | 277/555 |
| 4,132,421 | A * | 1/1979 | Corsi et al. | 277/565 |
| 4,243,235 | A | 1/1981 | Repella | |
| 4,542,573 | A | 9/1985 | Bainard | |
| 4,723,350 | A | 2/1988 | Kobayashi et al. | |
| 4,822,059 | A * | 4/1989 | Shimasaki et al. | 277/564 |
| 5,083,802 | A * | 1/1992 | Shimasaki et al. | 277/560 |
| 5,595,697 | A * | 1/1997 | Wada et al. | 264/135 |
| 5,921,555 | A * | 7/1999 | Johnston | 277/559 |
| 5,997,979 | A | 12/1999 | Kashima | |
| 6,079,715 | A | 6/2000 | Johnen et al. | |
| 6,149,158 | A | 11/2000 | Tripathy | |
| 6,168,164 | B1 | 1/2001 | Toth et al. | |
| 6,241,256 | B1 * | 6/2001 | Suggs et al. | 277/630 |
| 6,422,570 | B1 | 7/2002 | Ikeda et al. | |
| 6,945,536 | B1 * | 9/2005 | Iwakata et al. | 277/552 |
| 2001/0038179 | A1 | 11/2001 | Ikeda et al. | |

FOREIGN PATENT DOCUMENTS

JP    55-163368    * 12/1980

* cited by examiner

*Primary Examiner*—Alison K. Pickard
(74) *Attorney, Agent, or Firm*—Vedder Price Kaufman & Kammholz

(57) ABSTRACT

A large-diameter PTFE seal. The lip of the seal is made from a long strip of PTFE bound together at the ends with the aid of a patching tape to form a closed loop. The loop is then flanged and placed between an inner and an outer case, together with a rubber-like gasket, and the cases are crimped together, entrapping the lip material between them.

15 Claims, 4 Drawing Sheets

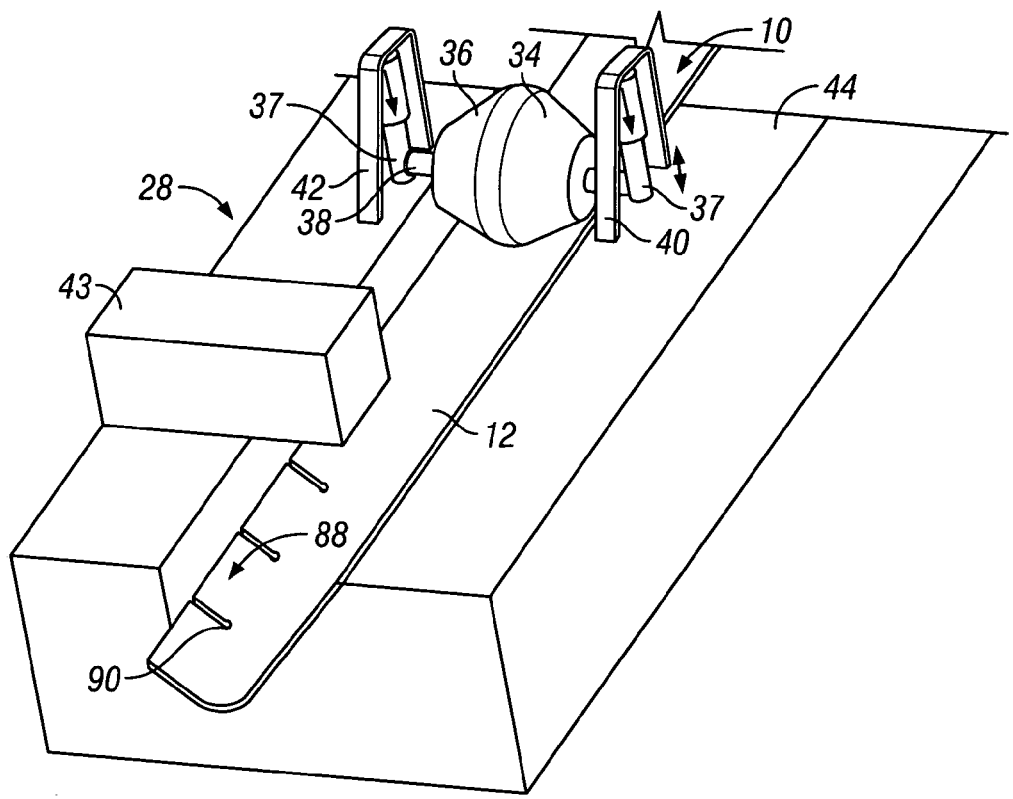
FIG. 7
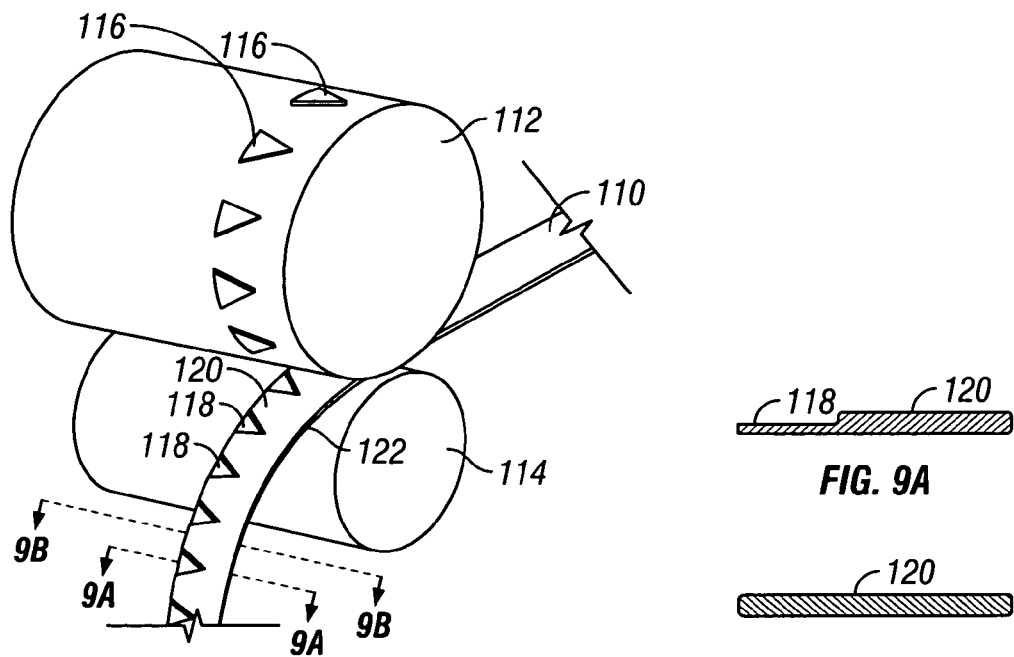
FIG. 8
FIG. 9A
FIG. 9B

LARGE DIAMETER POLYTETRAFLUOROETHYLENE OR LIKE SEALS

BACKGROUND OF THE INVENTION

The present invention relates generally to large diameter seals, and methods of making them, and more particularly, to such seals which contain a solid polytetrafluoroethylene (PTFE) or like fluorocarbon lip. Whereas seals having a PTFE material or the like for a lip have a number of advantages, including excellent abrasion resistance and excellent chemical and other solvent resistance, such seals have been relatively difficult and expensive to manufacture in large diameters.

Such large diameter seals are used, for example, to seal the lubricant into the bearings of huge rollers, such as the rollers used in steel mills, and of the same time, exclude contaminants from the rollers. Such rollers commonly have a diameter of from 24 inches to 48 or even 60 inches, or perhaps more.

Comparatively recently, there have been in use modern windmills with enormous blades turning turbines to generate electricity. These windmills customarily have very large shafts, perhaps two feet or more in diameter. These shafts need seals having the advantages of tetrafluoroethylene lips, particularly the excluder function, in view of the conditions under which these seals operate.

However, the use of such seals has been somewhat limited because of the expense of making such seals. At any rate, a more economical but still highly effective seal is needed and would be greatly desired.

The difficulty in manufacturing seals of this large diameter type are that, considering first the raw materials from which the lips are made, there have been at least two methods, each one of which has substantial drawbacks. One method of making such seals is to cut off a thin end of a cylindrical billet of PTFE, so that a huge diameter but thin ring of a PTFE material is formed. However, it is extremely expensive to obtain a billet of the size needed to accomplish this task.

The method of forming the lip portion of a seal from sheet material is not a problem with seals of a small diameter. However, when it comes to large diameters, such sheets of the proper size are prohibitively expensive, if indeed they can be found. Moreover, the enter center section, which would then be cut out, is normally wasted. In some cases, the remaining sheet must await formation of a smaller diameter seal. There may not be a demand for the intermediate sizes that could use the large remaining sheet of material.

However, with the present invention, it is possible to use very commonly available strips of material, which may then be flanged and formed with a slightly larger outside diameter than inside diameter and finally into a large closed loop of material. The inside diameter ("i.d.") of such a loop may then be used as the primary lip of such large diameter seal.

The material from which the lip is made is readily available as a very long strip at reasonable cost. Such strip material may typically have a length of up to several hundred feet, a width of 1 to 1.5 inches, and a thickness of 0.015 to 0.060 inches, usually, 0.030 to 0.050 inches. According to the invention, material in this form may be flanged so as to form two angularly related legs, typically 30° to 45° apart. Thereafter, the strip may be notched at intervals of 1 or 2 inches, or have holes punched in it together with a series of slits to the outer diameter ("o.d."). Such cuts enable the (PTFE) material to be curved so it can be formed into a continuous circular loop. This is done by placing the contoured ends of the strip of material in abutting relation and overlaid with a supplemental piece of a thin fluorocarbon (PTFE) tape. For such purposes, the tape may be a 0.007" in thickness, for example, and placed over both ends, which are then raised to a temperature in the vicinity of 500°–550° F. or even greater.

Having thus been formed and notched or slit on the outside diameter, such a lip is thereafter placed between an inner and outer case and, with the help of gasketing means such as a formed rubber gasket, compressed into position between two L-shaped flanges, the outer one of which is crimped over the inner one to keep the inner casing in place.

An alternate method involves a slightly different form of notching the exterior by forming holes and slits therein. In addition, there is a method which does not involve actually piercing through the outer diameter of the seal material, but which is formed by placing V-shaped debossments or depressed areas of significant depth in the outside diameter of the lip material. This makes the lip portion susceptible to being curved on the outer diameter and is also useful in this connection.

Accordingly, in view of the failure of the prior art to provide large diameter, PTFE or like lip seals, it is an object of the invention to provide an improved large diameter seal having a lip formed from a PTFE or like material.

Another object is to provide a novel method or methods of making such seal.

Another object is to form such a seal by steps which include selecting a readily available PTFE material in the form of a thin, narrow strip, joining the ends, flanging the strip thus formed and imparting an increased outside diameter to the strip.

Another object of the invention is to provide one or more methods of forming the raw material such as PTFE strip into a gradually curving outside diameter suitable for making into an effective seal.

A still further object of the invention is to provide a system using a roller, preferably heated, and a puncturing or cutting device which will flange the material and notch the outside diameter of a strip of material so as to render it suitable for seal manufacture by a novel method.

A further object of the invention is to provide a seal which is flanged and contains a large number of radial notches so as to effectively enlarge the outer diameter of the seal into which it is made.

Another object is to form the lip material into a moderate or shallow V-shape flange so that the inside diameter of the flange thus created is not overly strained during manufacture.

A further object of the invention is to provide a method of notching the outside diameter of seal raw material in order to allow it to be shaped into an enlarged dimension in relation to the inside diameter of the lip.

The objects and advantages of the invention are achieved by flanging an elongated strip of PTFE or like material, allowing the opposite edge of the strip from the flange to be elongated or thinned, placing the thinned or cut edge and an adhesive between inner and outer cases, and crimping the outer case over the inner case to hold the lip in place so as to form a large diameter PTFE or like seal.

The manner in which these and other objects and advantages of the invention are achieved in practice will be more clearly understood when taken in connection with the following description of the preferred embodiments of the invention and shown in the drawings in which like reference numbers indicate corresponding parts throughout.

A BRIEF DESCRIPTION OF THE DRAWINGS

FIG. 1 shows one end of an elongated PTFE strip being rolled into a flange and perforated on what will become its outer edge according to the invention;

FIG. 2 somewhat schematically shows both ends of a PTFE strip being joined to form a loop with a thin patch of similar material being placed thereover to aid in the fusing process;

FIG. 7 shows one alternate form of flanging and perforating the outer margin of the seal;

FIG. 8 shows a still further form of radially enlarging portions of the outer diameter of the seal strip by debossing or thinning portions of the outer edge of the strip;

FIG. 9A shows a section of the seal lip forming material of FIG. 8 in one position and taken along lines 9A—9A of FIG. 8; and FIG. 9B shows another section of the seal taken along lines 9B—9B of FIG. 8;

DESCRIPTION OF THE PREFERRED EMBODIMENTS OF THE INVENTION

Although the invention may be practiced in different ways and certain variations may occur to those skilled in the art, a brief description will be made of the manner in which a few of the embodiments of the invention may be carried into practice.

Figure 1:
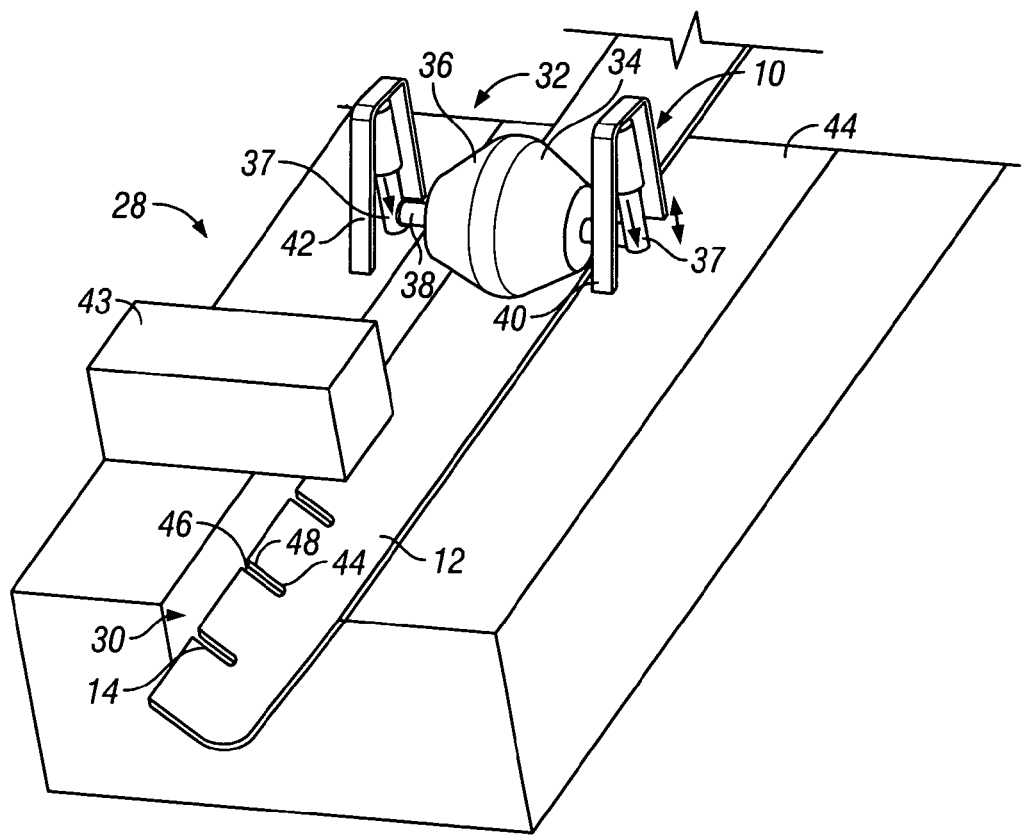
Figure 2:
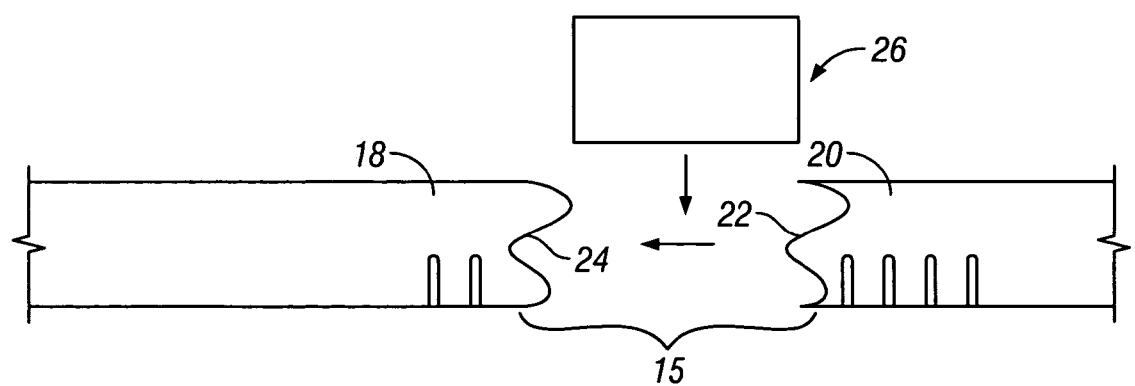
Figure 3:
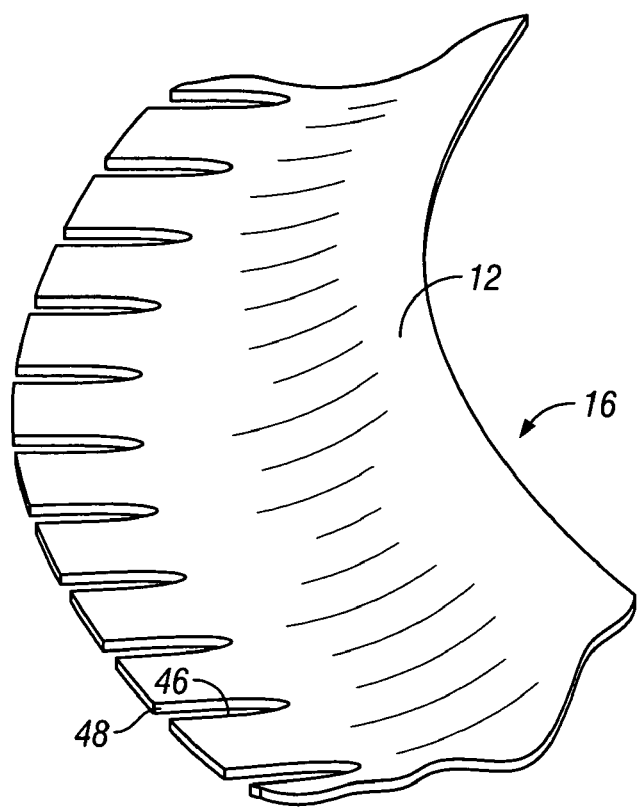
FIG. 3 shows a portion of the flanged strip being formed into a curve with the cuts or notches on the outer diameter.

Referring now to the drawings in greater detail, FIGS. 1–2 show, somewhat schematically, a strip generally designated 10 of a PTFE or like fluorocarbon material such as "Teflon" or the like, being flanged as at 12 and perforated as at 14 so as to be suitable for forming into a continuous loop 15 for use as the lip portion 16 (FIGS. 3 and 4) of a PTFE seal. In this case, two end portions, 18, 20 of the strip 10 are selected to be joined with their contoured end surface portions 22, 24 abutting each other. Thereafter, a thin strip 26 of a covering material, such as a tape made of the same or similar material as the strip 10 and having a thickness of 0.007", for example, is placed over the junction of the two ends 18, 20. The strip ends 18, 20 are then heated to 500°–550° F.

Just prior to undergoing such treatment, the strip 10 is placed in a cutting and forming apparatus generally designated 28 which includes a contoured trough generally designated 30, a heated roller generally designated 32, having inclined working surfaces 34, 36 so as to impart the necessary flange 12 or offset portion to the material.

The roller is held on an axle 38 which is subjected to a downward force of a varying degree. For example, the roller forces the strip 10 into the trough so as to impact the desired flange 12 to the strip 10. Depending on the thickness of the strip 10, this force may be up to two hundred pounds per square inch (200 psi) or more. In addition, with the desire to impart at least a temporary profile to the strip, the roller 32 may be heated up to about 500° F. or even more in some cases. The two supports 40, 42 are each affixed to the frame 44. These supports each hold an end of a piston-and-cylinder assembly 37 that acts downwardly on the axles 38. Consequently, a generally shallow v-shape or flange is imparted to these strips of Teflon material, which are typically 1.5" inches in diameter and approximately 0.030" to 0.050" in thickness.

Just after being formed into the illustrated v-shape by the roller 32, the material is then subject to having a plurality of contoured cutouts generally designated 14 formed therein by a notching element generally designated 43. Each cutout 14 has a semi-circular inner surface 44 and a pair of slightly spaced apart sidewall surfaces 46, 48.

Figure 4:
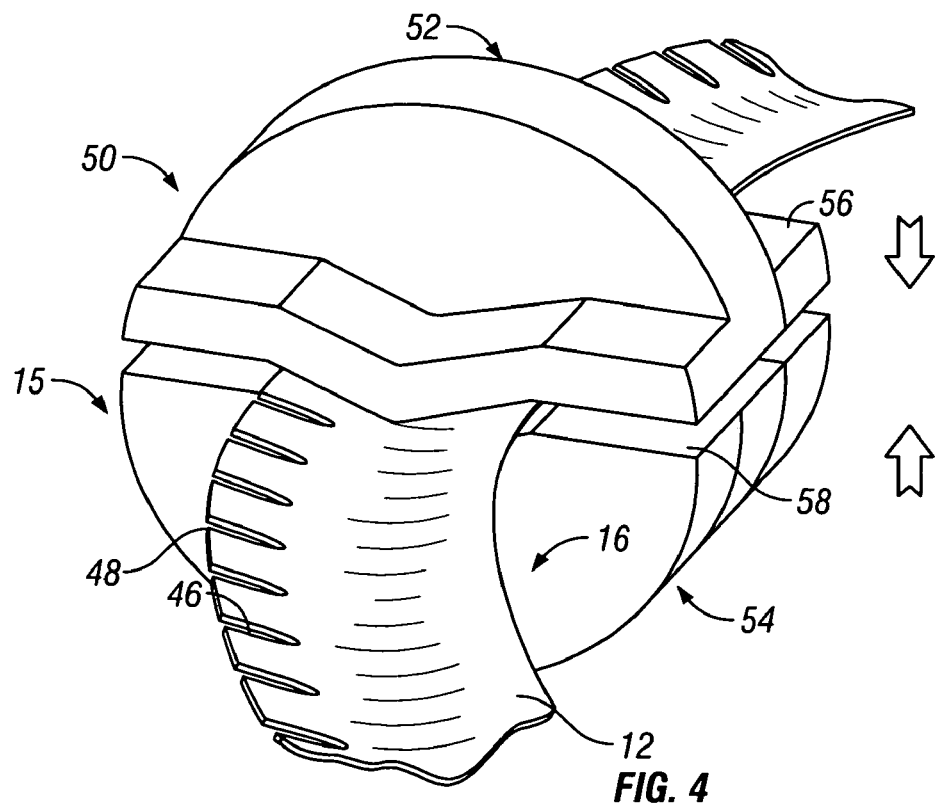
FIG. 4 shows placing the strip thus formed into a heated clamp to fuse the end portions of the strip of FIG. 2 together.

In order to form the continuous loop 15, as pointed out above, the closed end portions 18, 20 of the loop 15 are placed in a heated clamp generally designated 50 in FIG. 4. This heated clamp has a contoured top generally designated 52 and a contoured bottom generally designated 54. The contours are those of the v-shaped groove or flange which has been imparted to the material by the contoured roller discussed in connection with FIG. 1.

A heated upper surface 56 and a heated lower surface 58 are then activated and raised to a temperature of approximately 500–550°. This then fuses the two ends 18, 20 of the strip of material and the tape 26 together and forms them into a continuous loop 15. The tape 26 fills any slight gaps or imperfections which may occur in the contoured portions 26, 24 of the tape ends 18, 20.

Figure 5:
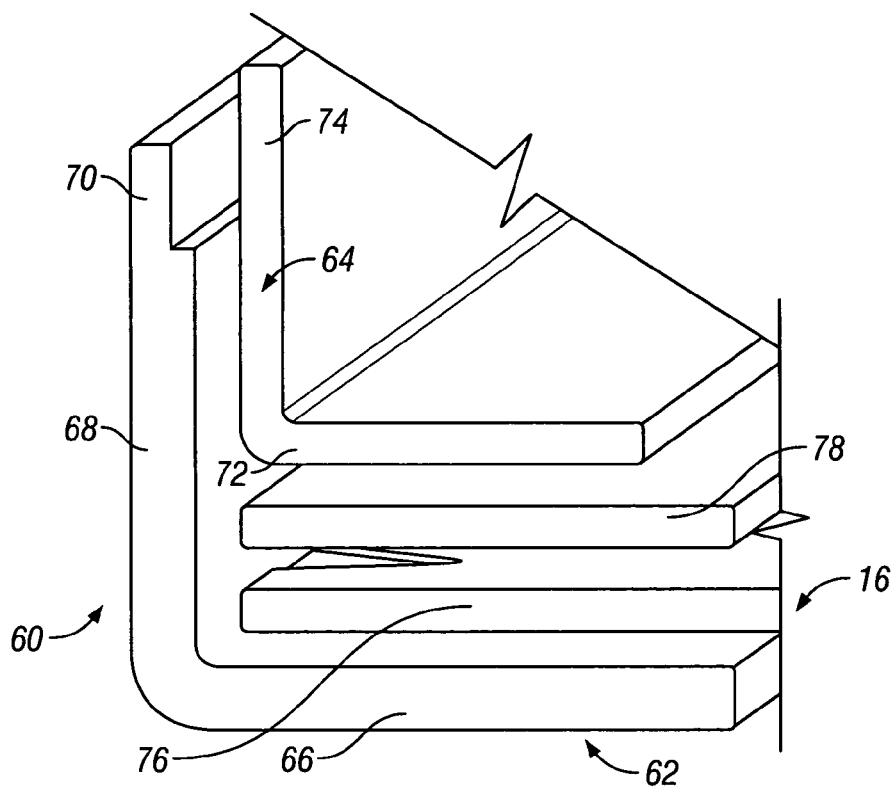
FIG. 5 shows the layers in their assembled position prior to crimping the outer-casing in place to hold the lip portion of the seal in position.
Figure 6:
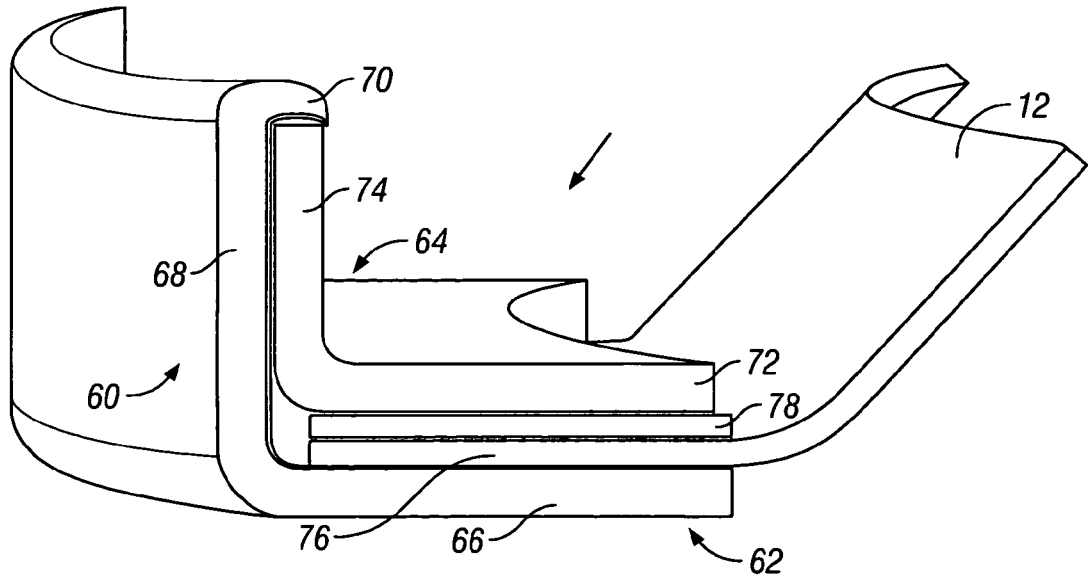
FIG. 6 shows the seal of FIG. 5 as finally assembled and crimped.

After this portion of the method has taken place, a seal, shown schematically in FIGS. 5 and 6 and generally designated 60, is formed of these components. The lip portion outside diameter ("o.d.") 76 of the seal is held between an outer case generally designated 62 and an inner case generally designed 64. The outer case 62 includes a radial flange 66, an axially extending flange 68, and a reduced thickness crimping portion 70. The inner case 64 includes a radial flange 72 and an axial flange 74. Sandwiched between the radial flanges 66, 72 is the outside diameter or notched portion 76 of the continuous strip 15 and a gasket 78 of a rubbery material used to help with the so-called secondary or non-moving seal surface and as an aid in securing the strip material 15 to the casing 60. This gasket material 78 may be formed from a flat section or a bead of synthetic rubber, a thermoplastic elastomer or a silicone rubber or like substance. An RTV (room temperature vulcanizing) silicone is used in some cases. The rubber like material aids in filling the various gaps in the seal and helps to hold the lip portion generally designated 16 thus formed in place within the seal assembly. The rubber gasketing, regardless of its exact makeup or shape, more than overcomes any cold-flow tendencies of the PTFE material to take a set or relax. This is because the rubbery material retains its considerable elasticity indefinitely. Final assembly takes place as shown in FIG. 6, when the reduced thickness portion 70 of the outer case 62 is crimped firmly over the axial flange 74 of the inner case 64, thus holding the elements in an assembled relation.

FIG. 7 shows an alternate method of forming the seal. This is substantially the same as that shown in FIG. 2 except that there are slits generally designated 88 in the raw material, and these are created by drilling or punching holes 90 and by cutting through or forming slits 92 to the o.d. of the strip 94. This enables the outer diameter portion of the strip 94 to assume the larger diameter needed as the material is formed into a loop and flanged on its i.d.

Referring now to FIG. 8, this shows a further alternate method of forming the seal strip 11 into a curved section. In this case, the flanging of the strip 110 is not shown for simplicity. The curve required in this case is created by a pair of heated rollers 112, 114 in opposed relation with only a clearance equal to the thickness of the material being formed between them. The upper roller 112 only is equipped for example with a plurality of triangular embossments 116 on it. When the strip 110 passes between the rollers, a plurality of debossments or indentations 118 are formed in the upper surface of the strip 110.

Because the strip is thinned, it is also widened, giving rise to an outer surface 120 which will be longer than the inner surface 122. This then causes the outer surface to become enlarged while the inner surface stays the same. Consequently, a curve is imparted to the material 110. The flange is not shown for simplicity, but is of the same order as that in the other figures. The debossments in the material can be adjusted in thickness and shape to create the desired outer diameter curvature. These are a depth of up to 0.040 of an inch, with the strip 110 having a thickness of 0.050 inches, merely for example.

The flanging of the edge of the strip opposite the edge containing the debossments, slits or contoured cutouts—all collectively referred to as areas of weakness—is very important to keep the flanged edge from buckling or otherwise forming an irregular surface instead of a surface laying flat on the cylindrical shaft to be sealed.

It is also important to have the rubber or rubber-like gasketing material at least partially surrounding the o.d. of the lip material. In this way the secondary (non-moving) seal maintains its integrity and permanence.

Although it is conceivable that the thin tape material could be omitted from its position overlying the end portions of the strip as the ends are being joined, this is unlikely because of irregularities in the strip of material.

When reference is made to PTFE, it will be understood to those skilled in the art that such material commonly can, and in this case does, contain one or more fillers such as glass fibers, graphite, molybdenum disulfide or several other additives.

It will thus be seen that the present invention provides novel and effective large diameter seals and materials of making them, and that the invention has a number of advantages and characteristics including those pointed out herein, and others which are inherent in the invention.

The invention claimed is:

1. A method of making a large diameter seal having a PTFE or lip and a two-piece metal casing, said method comprising forming the lip portion of said seal from of an extended strip of a PTFE material, forming at least a partial flange in one margin of said strip of material, forming a large circumferentially spaced apart areas of weakness in the opposite margin of said strip, forming said strip having said areas of weakness into a continuous loop of PTFE material by abutting the end portions of said strip together, placing a thin strip of compatible material over said abutted ends and raising said end portions to an elevated temperature, said areas of weakness of said strip lying toward the outer margin of said strip, placing at least said areas of weakness overlying the radial flange portion of an outer casing and placing a rubber-like gasket material adjacent said areas of weakness, covering said outer margin of said strip with an inner casing that nests with said outer casing, crimping said outer casing over said inner casing, thereby tightly confining said strip of PTFE material in place, and thereby creating a seal having a flanged, work-engaging lip of PTFE material.

2. A method as defined in claim 1 wherein said areas of weakness comprises a plurality of U-shaped cutouts in the outer margin of said strip.

3. A method as defined in claim 1 wherein said areas of weakness include a plurality of areas of decreased thickness having a generally V-shaped profile.

4. A method as defined in claim 1 wherein said areas of weakness include circular openings spaced from one margin, said circular openings being intersected by slits extending to the outer margin of said material.

5. A method as defined in claim 1 wherein said rubber-like material includes natural rubber and silicone RTV elastomers.

6. A method as defined in claim 5 wherein said rubber-like material comprises a bead of a silicone elastomer.

7. A method as defined in claim 1 wherein placing said rubber-like gasket material adjacent said lip material comprises placing said material so as to be engaged by both said inner and outer casings.

8. A large diameter seal unit having a lip portion made from a fluorocarbon-containing material and encased between an inner and an outer rigid casing, said lip portion being formed of a long, narrow strip of fluorocarbon material and having its end portions joined together by an overlying patch of a similar material, said end portions and said patch being fused together by heat and pressure to form a continuous loop, said loop including an at least partially flanged portion on a radially inner margin thereof and a large plurality of circumferentially spaced apart areas of weakness on a radially outer margin of said loop, said margin containing said areas of weakness being covered by an overlying layer of rubber-like material and being entrapped between said rigid casings, thereby leaving said flanged margin of said lip portion exposed so as to create an excluder seal for overlying a cylindrical member to be sealed.

9. A large diameter seal as defined in claim 8 wherein said areas of weakness comprise a large plurality of u-shaped cutouts in said outer margin of said lip portion.

10. A large diameter seal as defined in claim 8 wherein said areas of weakness comprise a large plurality of areas of decreased thickness in said outer margin of said lip portion, said areas having a generally V-shaped profile.

11. A large diameter seal as defined in claim 8 wherein said areas of weakness comprise circular openings spaced from the outer margin of said lip, said openings being intersected by slits extending to the outer edge of said outer margin.

12. A large diameter seal as defined in claim 8 wherein said rubber-like material includes natural rubber, silicone rubbers and silicone RTV elastomers.

13. A large diameter seal as defined in claim 8 wherein said rubber-like material is adhered to both axially inner and axially outer surfaces of said lip.

14. A large diameter seal as defined in claim 8 wherein said rigid casings are made from metal.

15. A large diameter seal as defined in claim 8 wherein said rigid casings are made from the class consisting of steel, aluminum and aluminum alloys.

\* \* \* \* \*